Aug. 29, 1961   D. L. DEVERICH   2,998,102
ADJUSTABLE VEHICLE WHEEL CHOCK
Filed Jan. 19, 1959
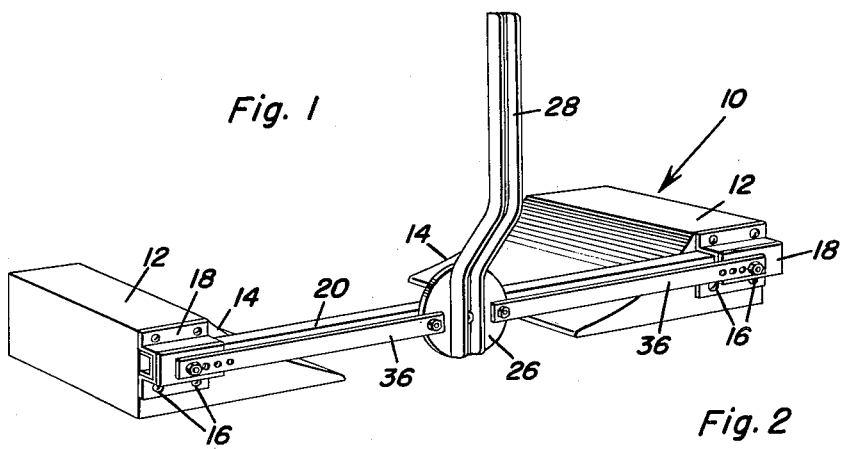
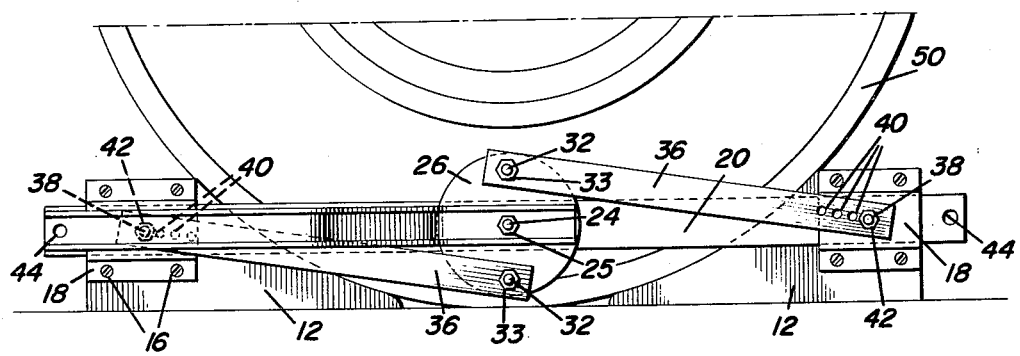
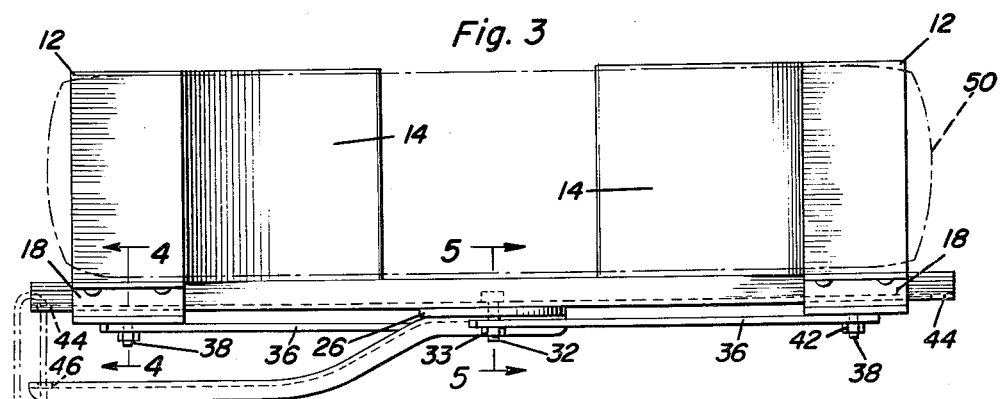
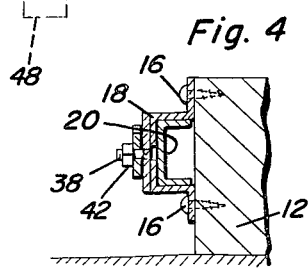
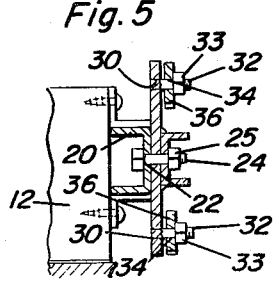
Daniel L. Deverich
INVENTOR.

United States Patent Office 2,998,102
Patented Aug. 29, 1961

1

2,998,102
ADJUSTABLE VEHICLE WHEEL CHOCK
Daniel L. Deverich, 7329 Ogden Ave., Lyons, Ill.
Filed Jan. 19, 1959, Ser. No. 787,708
5 Claims. (Cl. 188—32)

This invention relates to a novel and useful adjustable vehicle wheel chock adapted to be used in connection with a wheeled vehicle of any type for maintaining the vehicle in a stationary position, and more particularly relates to a device which is adapted to be secured both in front of and behind a wheel of a vehicle to prevent the rotation of that wheel along the surface on which it is resting.

The main object of this invention is to provide a wheel chock which will position a wheel block in front of and behind a wheel, and one which will provide a means for drawing the wheel blocks towards each other into contact with the lower portions of the wheel adjacent the point at which the wheel is supported.

A further object of this invention is to provide a vehicle wheel chock which may be adjusted so that it may be used in connection with relatively all sizes of wheels.

A still further object of this invention, in accordance with the preceding objects, is to provide a vehicle wheel chock which may be retained or locked in a position embracing the lower portion of a wheel in front of and behind the point at which it is supported.

A final object of this invention, in accordance with the preceding objects, is to provide a vehicle wheel chock which lends itself to conventional forms to manufacture and which is comparatively compact so that it may be conveniently carried in existing storage compartments in vehicles with which it is to be used.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the invention with the wheel blocks shown in the extended position in preparation to placing the same in front of and behind the lower portions of a wheel;

FIGURE 2 is a side elevational view of the invention shown in the closed position with the wheel chocks embracing the forward and rearward lower portions of a wheel, parts of the wheel being broken away;

FIGURE 3 is a top plan view of the invention as seen in FIGURE 2 with the outline of the wheel being shown in phantom lines, and with an ordinary type of bicycle lock shown retaining the operating lever in the position it attains when the wheel blocks are moved into contact with the wheel;

FIGURE 4 is an enlarged vertical sectional view taken substantially upon the plane indicated by the section line 4—4 of FIGURE 3; and FIGURE 5 is an enlarged vertical sectional view taken substantially upon the plane indicated by the section line 5—5 of FIGURE 3 showing the manner in which the circular disk is mounted.

Referring now more specifically to FIGURE 1 of the drawings, the numeral 10 generally designates the wheel chock assembly comprising the present invention including two wheel blocks 12 having concave confronting faces 14. Secured to each block 12 by means of screws 16, or any suitable fastening means, are U-shaped brackets 18. Each bracket 18 slidingly receives one end of a U-shaped strap 20 therein.

With attention drawn to FIGURE 5 of the drawings, inserted in a bore 22, which is formed through connecting strap 20 substantially at the mid-point thereof, is a threaded bolt 24 which pivotally mounts a circular disk

2

26 upon connecting strap 20, the later having an operating lever 28 suitably mounted upon a diameter thereof, the bolt 24 being secured therethrough by means of a threaded nut 25. On a diameter of disk 26, at right angles to operating lever 28 a spaced distance from the periphery thereof, are formed apertures 30 which each have, inserted and secured therein in a suitable manner, one end of one of the two pins 32. The outer ends of pins 32 are threaded and inserted through bore 34 formed in the inner ends of two actuating straps 36 and secured therethrough by means of threaded bolts 33. The outer ends of actuating straps 36 are each pivotally connected to brackets 18 by means of bolts 38 secured through one of the spaced apertures 40 formed in brackets 18. The pins 32 are secured through the inner ends of straps 36 by means of threaded nuts 33, and bolts are secured through the outer ends of straps 36 by means of threaded nuts 42.

An aperture 44 is formed in each end of connecting strap 20, see FIGURE 2.

As best seen in FIGURE 3 of the drawings, the operating lever 28 is of sufficient length, and is provided with an aperture 46, formed a spaced distance from the outer end thereof, so that when the lever 28 is in either horizontal position, the aperture 46 is registerable with one of the apertures 44 formed in the connecting straps ends. A locking device, such as an ordinary shank lock 48, is provided which may be passed and locked through the aligned apertures and thereby retaining the wheel blocks 12 in position embracing the lower portion of the wheel 50.

In operation, the wheel chock 10 is first adjusted by positioning the bolts 38 through the desired apertures 42, so that the wheel blocks 12 will tightly embrace the lower portions of the wheel 50 when the operating lever 28 is in a horizontal position. The wheel chock 10 is then positioned with one wheel block 12 in front of the wheel 50, and the other behind the wheel 50. The operating lever 28 is then moved to a horizontal position causing the actuating strap 36 to draw the wheel blocks 12 together towards the lower portion of the wheels so that the concave confronting faces 14 thereof will embrace the forward and rearward portions of the tire adjacent the point at which it is supported. If it is desired to secure the wheel chock 10 in the operated position, a suitable locking means such as shank lock 48 may then be secured and locked through aligned apertures 44 and 46.

It is to be understood that any suitable material may be used for the construction of the wheel blocks 12 such as wood or a box-like metal structure, etc., to which the U-shaped brackets may be secured any suitable fastening means, such as screws or threaded bolts etc., respectively.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable wheel chock comprising two blocks, a connecting strap disposed between said blocks, means slidingly connecting said blocks to opposite ends of said connecting strap, and actuating means carried by said connecting strap and operatively connected to said blocks for sliding the latter along said strap towards and from each other and into engagement with the forward and rearward portion of a wheel disposed therebetween, said sliding connecting means comprising a bracket secured to each of said blocks having an opening therethrough in alignment with said connecting strap and adapted to slidingly receive therethrough the adjacent end of the latter.

2. The combination of claim 1, wherein said actuating means comprises a circular disk pivotally mounted on said connecting strap intermediate the ends thereof and having an outwardly projecting lever connected thereto for effecting the rotation thereof, two actuating straps pivotally secured at their inner ends to said disk along a cord thereof, and pivoted at their outer ends to one of said brackets.

3. The combination of claim 2 including means for adjusting the effective length of at least one of said actuating straps.

4. The combination of claim 3 including apertures formed through each end of said connecting strap and an aperture formed through the outer end of said lever with the aperture on the lever being registrable with each of the apertures formed through the ends of said connecting strap for receiving a fastener therethrough.

5. The combination of claim 1 wherein said actuating means comprises a circular disk pivotally mounted on said connecting strap intermediate the ends thereof and having an outwardly projecting lever connected thereto for effecting the rotation of said disk, two actuating straps pivotally secured at their inner ends to said disk along a cord thereof, and pivoted at their outer ends to one of said brackets, the axis of rotation of said disk extending in a horizontal plane substantially at right angles to the movement of said blocks toward and away from each other.

References Cited in the file of this patent

UNITED STATES PATENTS

| | | |
|---|---|---|
| 837,235 | Lowe | Nov. 27, 1906 |
| 2,325,235 | Esbeck | July 27, 1943 |
| 2,442,023 | Schwarzhoff | May 25, 1948 |
| 2,461,248 | Wright | Feb. 8, 1949 |

FOREIGN PATENTS

| | | |
|---|---|---|
| 1,017,928 | Germany | Oct. 17, 1957 |